2,941,688

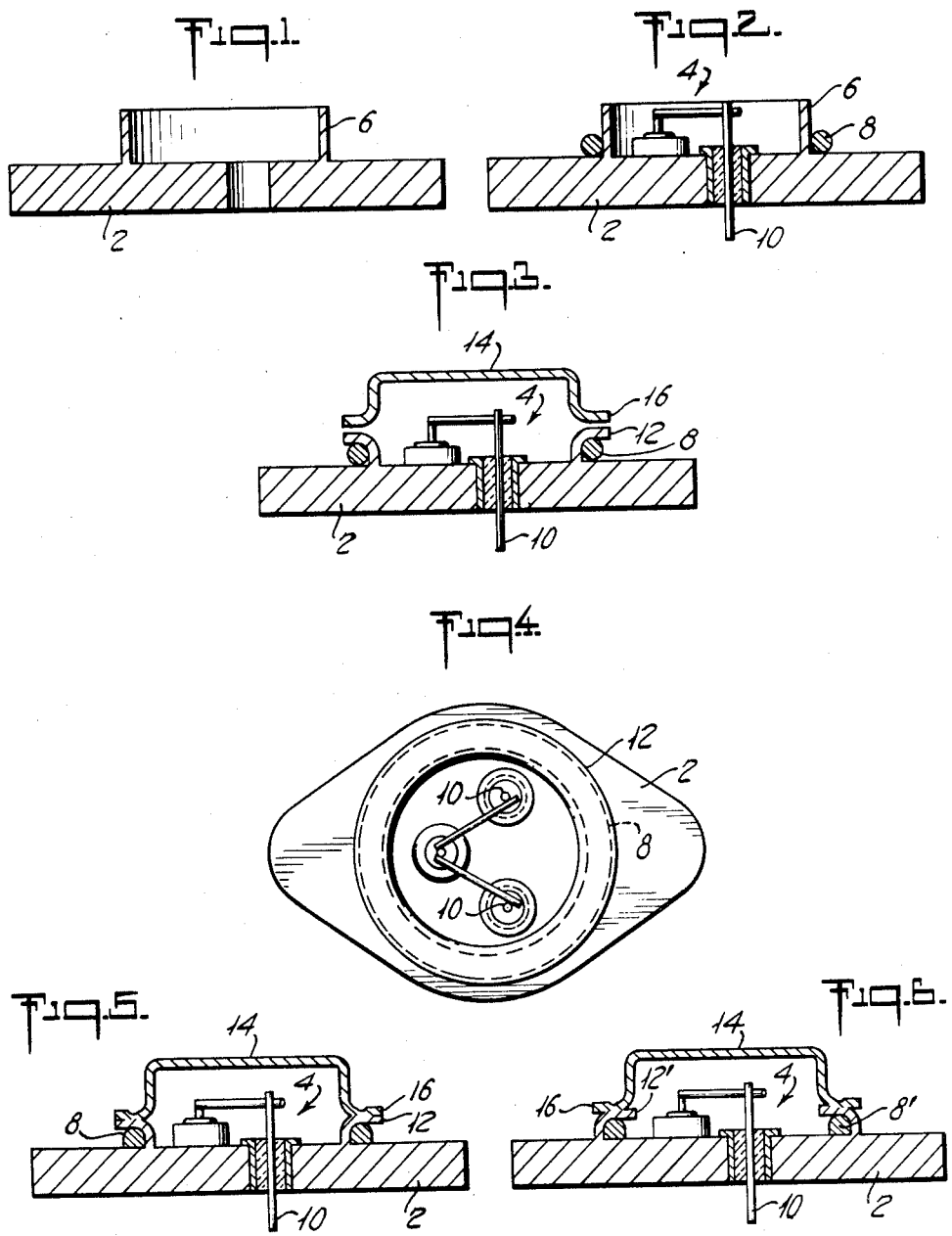

ENCAPSULATION OF ELECTRONIC COMPONENT AND METHOD OF MAKING THE SAME

Raymond G. Chamberlin, Short Hills, and Herbert S. Evander, Paramus, N.J., assignors to Tung-Sol Electric Inc., a corporation of Delaware Filed Dec. 31, 1957, Ser. No. 706,443

7 Claims. (Cl. 220—2.3)

The present invention relates to the hermetic sealing of small electronic or electrical components such as transistors or the like and comprises a novel method of adapting cold forming or welding techniques to the production of a package of which the maximum cross section is not circular. The invention comprises also the novel encapsulated product or package resulting from the practice of the process of the invention.

In a cold forming process between metallic members, such as a base and a cap or cover, the mating parts to be cold formed together should be annular to insure equal distribution of forces and a sound laminar flow of material. Final sealing of a package by cold forming is advantageous because degradation of the device by heat, fluxes, solder or the like during the encapsulation process is avoided. This method of encapsulation employing cold forming of metals has heretofore been employed only when the maximum cross section of the resulting package is circular and the weld is formed at the periphery of this section which is readily accessible to the circular forming dies.

In accordance with the present invention a circular cold weld of a diameter less than the maximum transverse dimension of the package is made by the expedient of making one element of the forming die a permanent part of the package. More specifically, a cylindrical wall is provided on a non-circular base. The element is mounted on the base within the area defined by the wall. A ring, which is to serve as an anvil and as an element of the forming die during the cold forming process, is then placed on the base coaxial with the cylindrical wall and in engagement therewith. The upper end of the wall is then flared about the ring and a lip of a cover member is then cold welded to the flared lip of the cylindrical wall, the cold welding of the parts locking the ring to the base to remain as part of the package. The ring may be positioned within the cylindrical wall or it may encompass the wall. In either case the ring serves the same purpose.

For a better understanding of the invention and of the resulting product reference may be had to the accompanying drawings of which Fig. 1 is a vertical sectional view of a non-circular base upon which an electrical component is to be mounted, the base being provided, in accordance with the invention, with a cylindrical wall formed integral therewith;

Fig. 2 is a sectional view similar to Fig. 1 but showing the component mounted on the base and the ring which is to serve as an anvil positioned on the base about the wall;

Fig. 3 is a sectional view showing the parts just prior to encapsulation;

Fig. 4 is a plan view of the base and parts carried thereby in the condition represented by Fig. 3;

Fig. 5 is a vertical sectional view of the completed package; and

Fig. 6 is a view similar to Fig. 5 but representing a modification.

Referring to the drawing, a non-circular base of copper or aluminum upon which an electrical component is to be mounted is indicated by the reference numeral 2, the component being shown diagrammatically as a transistor 4. In accordance with the invention the base 2 is provided with an upstanding cylindrical wall 6 and a steel ring 8, in the embodiment illustrated in Figs. 1 to 5, is slide over the wall 6 to engage the outer periphery thereof. The leads of the transistor 4 are welded to rods 10 insulatedly fused through the base 2, as by glass-to-metal seals, within the circular area of the base defined by the wall 6. The upper end of the cylindrical wall is then flared outwardly around the ring 8 to form an annular lip 12. A cover member 14, also of copper or aluminum and having an annular lip 16 is positioned with the lip 16 in engagement with the lip 12 of the cylindrical wall. The lips 12 and 16 are then pressed together against the ring 8 to cold form the metals thereof and cause lamina flow therebetween and a complete hermetic seal about the entire periphery of the junction between the cap and wall. During the cold forming the ring 8 serves as the bottom half of the circular die used in the cold forming process and is locked in place on the base 2.

Alternatively a ring 8', indicated in Fig. 6, of a diameter such as to fit within the circular wall 6 could be employed in which case the wall 6 is flared inwardly over the ring 8' to form an inturned lip 12'. The lip 16 of the cover 14 is then brought into contact with the lip 12' and the lips pressed together against the ring 8 as in the process described in connection with Figs. 1 to 5.

From the foregoing description it will be apparent that the invention retains the advantage of circular cold welds in the formation of a package of non-circular maximum cross section or of a maximum cross section of any conformation larger than that of the weld. Although the electrical component enclosed in the new package is illustrated as a transistor obviously the invention is not concerned with the particular component to be encapsulated. Also, although the leads of the component are shown as sealed through the base obviously the leads could be sealed through the cover member if desired.

The following is claimed:

1. The method of cold forming a hermetically sealed package of an electrical component on a non-circular base which comprises providing a cylindrical wall on the base encompassing the component, positioning a metal ring on the base with its center on the axis of the wall and with its surface engaging a surface of the wall, flaring the free end of the wall over the top of the ring to form an annular lip and finally cold welding the so formed lip to an annular lip of a cover member and locking the ring to the base by forcing the lips together against the ring as an anvil member.

2. The method according to claim 1 wherein the surface of the ring engages the outer surface of the wall.

3. The method according to claim 1 wherein the surface of the ring engages the inner surface of the wall.

4. The method of forming a hermetically sealed package of an electrical component on a non-circular base which comprises providing on the base a cylindrical wall of a diameter greater than the largest transverse dimension of the component, mounting the component on the base within the wall, insulatedly sealing electrical leads of the device through the circular portion of the base defined by the wall, positioning a metal ring on the base with its center on the axis of the wall and with its surface engaging a surface of the wall, flaring the free end of the wall over the top of the ring to form an annular lip and finally cold welding the so formed lip to an annular lip of a cover member by forcing the lips together against the ring as an anvil member.

5. The method of making a circular cold weld between an annular lip of a cover member and a base carrying an electrical component to provide an hermetically sealed package of the component when the base has a maximum periphery greater than the periphery of the lip of the cover member which comprises providing a cylindrical wall on the base encompassing the component, positioning a metal ring on the base with its center on the axis of the wall and with its surface engaging a surface of the wall, flaring the free end of the wall over the top of the ring to form an annular lip and finally cold welding the so formed lip to the annular lip of the cover member and locking the ring to the base by forcing the lips together against the ring as an anvil member.

6. A hermetically sealed package of an electrical component comprising a base plate having an upstanding cylindrical wall integral therewith of a diameter less than the minimum width of the base plate, said wall surrounding the component, a cover member having a cylindrical wall, an annular flange integral with both said upstanding wall and said cylindrical wall of the cover member and uniting the same to form a hermetic enclosure for the component, and means cooperating in the formation of said flange and comprising a hard metal ring coaxial with said upstanding wall and locked to the base plate by said flange.

7. A hermetically sealed package of an electrical component comprising a base plate, an upstanding cylindrical wall integral therewith for maximum heat conduction to the base plate and of a diameter less than the minimum width of the base plate, said wall surrounding the component and having a turned back upper lip, a generally cylindrical cover member having a peripheral lip, and means cooperating in the sealing of the cover member to the wall comprising a hard metal ring on the base plate coaxial with the wall, said lips merging in a cold welded annular flange locking said ring to the base plate.

References Cited in the file of this patent

UNITED STATES PATENTS

| | | |
|---|---|---|
| 2,248,817 | Eiben | July 8, 1941 |
| 2,344,325 | Punte | Mar. 14, 1944 |
| 2,568,512 | Reilly | Sept. 18, 1951 |
| 2,608,887 | Sowter | Sept. 2, 1952 |
| 2,728,546 | De Giers | Dec. 27, 1955 |
| 2,734,097 | Avery | Feb. 7, 1956 |
| 2,751,674 | Stray | June 26, 1956 |

FOREIGN PATENTS

| | | |
|---|---|---|
| 1,088,170 | France | Sept. 8, 1954 |
| 1,153,297 | France | Sept. 30, 1957 |
| 784,939 | Great Britain | Oct. 23, 1957 |